United States Patent
Na

(10) Patent No.: US 9,288,482 B2
(45) Date of Patent: Mar. 15, 2016

(54) METHOD FOR PROCESSING IMAGES IN DISPLAY DEVICE OUTPUTTING 3-DIMENSIONAL CONTENTS AND DISPLAY DEVICE USING THE SAME

(75) Inventor: Sungbin Na, Pyeongtaek-si (KR)

(73) Assignee: LG ELECTRONICS INC., Seoul (KR)

( * ) Notice: Subject to any disclaimer, the term of this patent is extended or adjusted under 35 U.S.C. 154(b) by 759 days.

(21) Appl. No.: 13/210,023

(22) Filed: Aug. 15, 2011

(65) Prior Publication Data

US 2012/0038754 A1 Feb. 16, 2012

(30) Foreign Application Priority Data

Aug. 16, 2010 (KR) .................. 10-2010-0078743

(51) Int. Cl.
*H04N 13/04* (2006.01)
*H04N 13/00* (2006.01)

(52) U.S. Cl.
CPC ......... *H04N 13/0438* (2013.01); *H04N 13/007* (2013.01); *H04N 13/0022* (2013.01); *H04N 13/0475* (2013.01)

(58) Field of Classification Search
CPC ... H04N 13/0022; G06F 3/011; G06T 19/006
See application file for complete search history.

(56) References Cited

U.S. PATENT DOCUMENTS

| | | | | |
|---|---|---|---|---|
| 4,649,425 | A | * 3/1987 | Pund | 348/52 |
| 6,243,054 | B1 | * 6/2001 | DeLuca | 345/7 |
| 2005/0059488 | A1 | * 3/2005 | Larsen et al. | 463/36 |
| 2005/0089212 | A1 | 4/2005 | Mashitani et al. | |
| 2005/0286125 | A1 | 12/2005 | Sundstrom et al. | |
| 2007/0047040 | A1 | * 3/2007 | Ha | 359/24 |
| 2009/0096863 | A1 | 4/2009 | Kim et al. | |
| 2010/0166338 | A1 | 7/2010 | Lee et al. | |
| 2011/0069153 | A1 | 3/2011 | Nakane | |

FOREIGN PATENT DOCUMENTS

| | | |
|---|---|---|
| CN | 1973555 A | 5/2007 |
| EP | 1 089 573 A2 | 4/2001 |
| EP | 2 306 729 A1 | 4/2011 |
| WO | WO 2010/013382 A1 | 2/2010 |

* cited by examiner

*Primary Examiner* — Joseph Ustaris
*Assistant Examiner* — Zhubing Ren
(74) *Attorney, Agent, or Firm* — Birch, Stewart, Kolasch & Birch, LLP

(57) ABSTRACT

A method for processing images in a display device outputting 3-dimensional (3D) contents and a display device using the same are disclosed herein. The method includes the steps of adjusting output positions of one of a first video image and a second video image, adjusting an angle of one of the first video image and the second video image, and outputting the first video image and the second video image in a 3D format.

20 Claims, 14 Drawing Sheets

(a)

(b)

(c)

(a)

(b)

(c)

METHOD FOR PROCESSING IMAGES IN DISPLAY DEVICE OUTPUTTING 3-DIMENSIONAL CONTENTS AND DISPLAY DEVICE USING THE SAME

Pursuant to 35 U.S.C. §119(a), this application claims the benefit of the Korean Patent Application No. 10-2010-0078743, filed on Aug. 16, 2010, which is hereby incorporated by reference as if fully set forth herein.

BACKGROUND OF THE INVENTION

1. Field of the Invention

The present invention relates to a method for processing images in a display device outputting 3-dimensional (3D) contents and a display device using the same and, more particularly, to a method for processing images in a system outputting 3D format contents, by adjusting output positions of 3D image data so that the 3D image data can be optimized to a viewing position of the user, and a display device using the same.

2. Discussion of the Related Art

The current broadcasting environment is rapidly shifting from analog broadcasting to digital broadcasting. With such transition, contents for digital broadcasting are increasing in number as opposed to contents for the conventional analog broadcasting, and the types of digital broadcasting contents are also becoming more diverse. Most particularly, the broadcasting industry has become more interested in 3-dimensional (3D) contents, which provide a better sense of reality and 3D effect as compared to 2-dimensional (2D) contents. And, therefore, a larger number of 3D contents are being produced.

3D image data may be seen by a stereoscopic principle of both the left eye and the right eye. More specifically, a binocular parallax between the two eyes plays the key role of providing a cubic effect (or 3D effect) of an object that is being viewed. When each of the left eye and the right eye views a correlated flat image, the human brain combines the two different images and so as to perceive the depth perception (or illusion of depth) and sense of reality of the 3D content. Such 3D image display may be categorized as a stereoscopic method, a volumetric method, and a holographic method.

When processing 3D image data by using the principles of the stereoscopic method, a single object is filmed by two different cameras from different locations, so as to create left image data and right image data. Thereafter, when each of the created images is separately inputted (or transmitted) to the left eye and the right eye, so that the two images can be orthogonally polarized, the viewer's brain may combine the image inputted to the left eye and the image inputted to the right eye, thereby creating a 3D image. At this point, the viewing angle of the two cameras viewing the object and the distance between each camera from the object may act as the crucial factors for representing the illusion of depth of the 3D image data.

However, if the above-described 3D image data are outputted from the related art display device, the cubic effect may be maximized only when the distance between a display screen of the related art display device and the user (or viewer) and the viewing angles of both left and right eyes for viewing the 3D image data are in concurrence with the distance between each of the two cameras and the object and with the viewing angles of the two cameras filming the object, during the creation of the corresponding 3D image data. However, in actual viewing environments, the above-described conditions may often fail to concur with one another. Thus, the illusion of depth of the 3D image data cannot be maximized, thereby causing the viewer to experience side effects, such as dizziness, headaches, and so on. Therefore, a method for processing images in a display device outputting 3-dimensional (3D) contents and a display device using the same, which can output 3D image data with optimal 3D effect with respect to the user's viewing conditions, are required to be developed.

SUMMARY OF THE INVENTION

Accordingly, the present invention is directed to a method for processing images in a display device outputting 3-dimensional (3D) contents and a display device using the same that substantially obviate one or more problems due to limitations and disadvantages of the related art.

An object of the present invention is to provide a method for processing images in a display device outputting 3-dimensional (3D) contents and a display device using the same that can output 3D image data with optimal 3D effect with respect to the user's viewing conditions.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of outputting images from a 3-dimensional (3D) display device includes adjusting output positions of one of a first video image and a second video image, adjusting an angle of one of the first video image and the second video image, and outputting the first video image and the second video image in a 3D format.

In another aspect of the present invention, a 3-dimensional (3D) display device includes an output position adjusting unit configured to determine a user viewing distance between a user and the 3D display device, to calculate a difference value between the determined user viewing distance and an optimal viewing distance and, when the difference value is greater than or equal to a first reference value, to adjust an output position of a 3D image, the 3D image being an output subject, and a 3D formatter configured to output the 3D image having its output position adjusted in a 3D format.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

In addition, although the terms used in the present invention are selected from generally known and used terms, the terms used herein may be varied or modified in accordance with the intentions or practice of anyone skilled in the art, or along with the advent of a new technology. Alternatively, in some particular cases, some of the terms mentioned in the description of the present invention may be selected by the applicant at his or her discretion, the detailed meanings of which are described in relevant parts of the description herein. Furthermore, it is required that the present invention is understood, not simply by the actual terms used but by the meaning of each term lying within.

Figure 1:
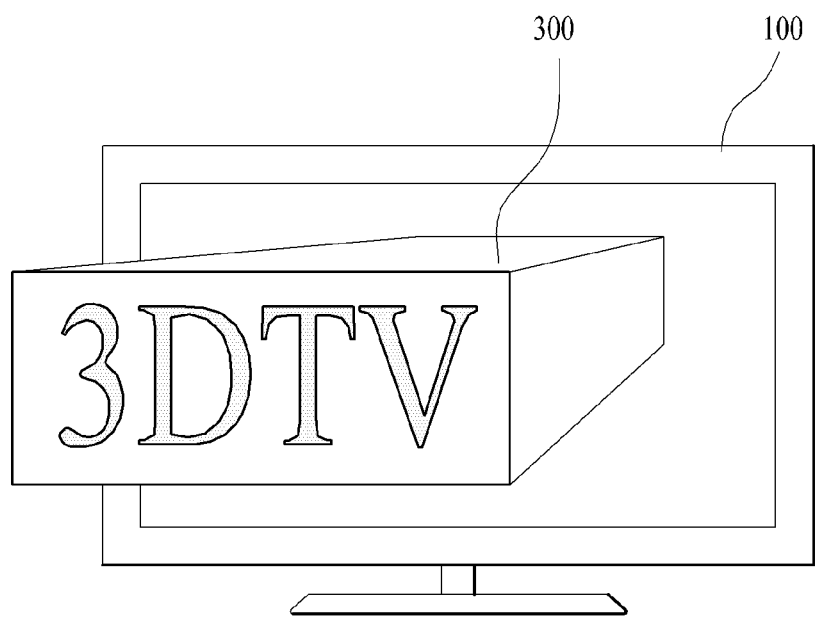
FIG. 1 illustrates a display device providing 3D contents according to an embodiment of the present invention.
Figure 1:
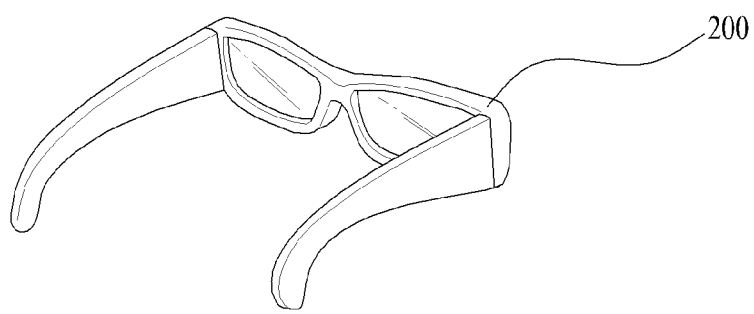

FIG. 1 illustrates a display device providing 3D contents according to an embodiment of the present invention. According to the present invention, a method of showing 3D contents may be categorized as a method requiring glasses and a method not requiring glasses (or a naked-eye method). The method requiring glasses may then be categorized as a passive method and an active method. The passive method corresponds to a method of differentiating a left-eye image and a right-eye image using a polarized filter. Alternatively, a method of viewing a 3D image by wearing glasses configured of a blue lens on one side and a red lens on the other side may also correspond to the passive method. The active method corresponds to a method of differentiating left-eye and right-eye views by using liquid crystal shutter glasses, wherein a left-eye image and a right-eye image are differentiated by sequentially covering the left eye and the right eye at a predetermined time interval. More specifically, the active method corresponds to periodically repeating a time-divided (or time split) image and viewing the image while wearing a pair of glasses equipped with an electronic shutter synchronized with the cycle period of the repeated time-divided image. The active method may also be referred to as a time split type (or method) or a shutter glasses type (or method). The most commonly known method, which does not require the use of 3D vision glasses, may include a lenticular lens type and a parallax barrier type. More specifically, in the lenticular lens type 3D vision, a lenticular lens plate having cylindrical lens arrays perpendicularly aligned thereon is installed at a fore-end portion of an image panel. And, in the parallax barrier type 3D vision, a barrier layer having periodic slits is equipped on an image panel.

Among the many 3D display methods, FIG. 1 illustrates an example of an active method of the stereoscopic display method. However, although shutter glasses are given as an exemplary means of the active method according to the present invention, the present invention will not be limited only to the example given herein. Therefore, it will be apparent that other means for 3D vision can be applied to the present invention.

Referring to FIG. 1, the display device according to the embodiment of the present invention outputs 3D image data from a display unit. And, a synchronization signal Vsync respective to the 3D image data is generated so that synchronization can occur when viewing the outputted 3D image data by using a pair of shutter glasses 200. Then, the Vsync signal is outputted to an IR emitter (not shown) within the shutter glasses, so that a synchronized display can be provided to the viewer (or user) through the shutter glasses.

By adjusting an opening cycle of a left eye liquid crystal display panel and a right eye liquid crystal display panel in accordance with the synchronization signal (Vsync), which is received after passing through the IR emitter (not shown), the shutter glasses 200 may be synchronized with the 3D image data 300 being outputted from the display device 100. At this point, the display device processes the 3D image data by using the principles of the stereoscopic method. More specifically, according to the principles of the stereoscopic method, left image data and right image data are generated by filming an object using two cameras each positioned at a different location. Then, when each of the generated image data are orthogonally separated and inputted to the left eye and the right eye, respectively, the human brain combines the image data respectively inputted to the left eye and the right eye, thereby creating the 3D image. When image data are aligned so as to orthogonally cross one another, this indicates that the generated image data do not interfere with one another.

Figure 2:
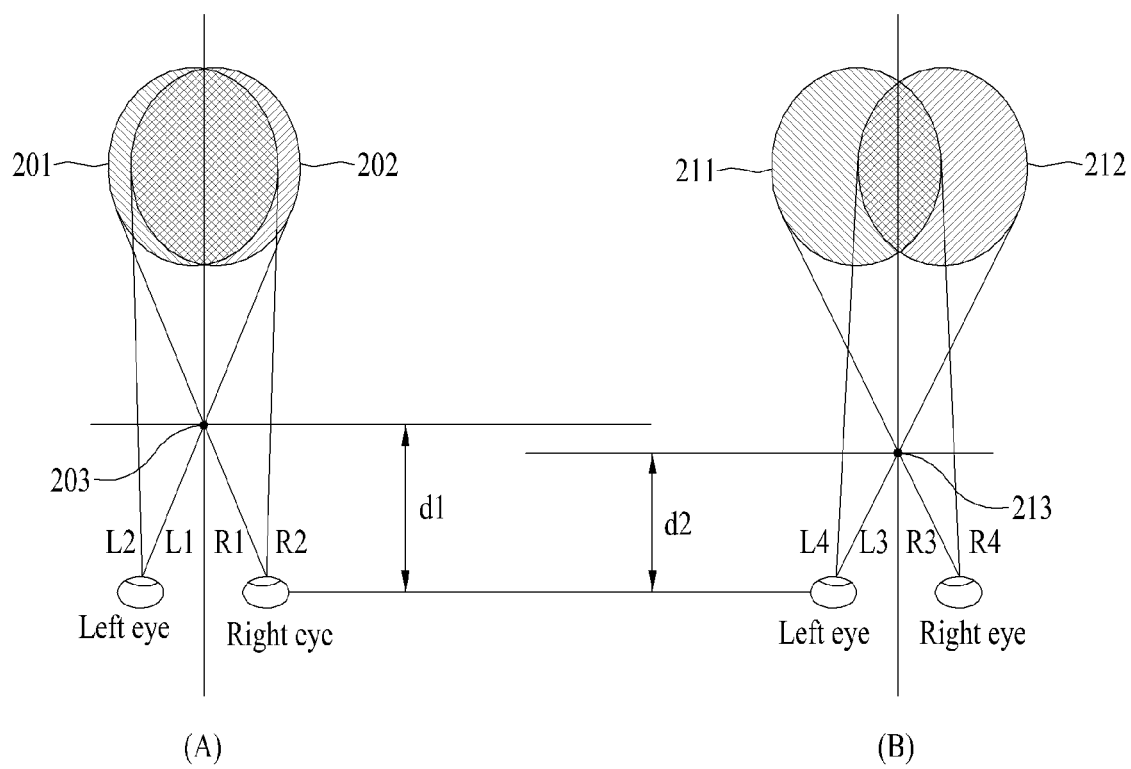
FIG. 2 illustrates an example showing a perspective based upon a distance or parallax between light image data and right image data.

FIG. 2 illustrates an example showing a perspective based upon a distance or parallax between light image data and right image data. Herein, FIG. 2(A) shows an image position 203 of the image created by combining both image data, when a distance between the left image data 201 and the right image data 202 is small. And, FIG. 2(B) shows an image position 213 of the image created by combining both image data, when a distance between the left image data 211 and the right image data 212 is large. More specifically, FIG. 2(A) and FIG. 2(B) shows different degrees of perspective of the images that are formed at different positions, based upon the distance between the left eye image data and the right eye image data, in an image signal processing device.

Referring to FIG. 2(A), when drawing extension lines R1 and R2 by looking at one side of the right image data 201 and the other side of the right image data 201 from the right eye, and when drawing extension lines L1 and L2 by looking at one side of the left image data 202 and the other side of the left image data 202 from the left eye, the image is formed at a crossing point 203 between the extension line R1 of the right image data and the extension line L1 of the left image occurring at a predetermined distance d1 between the right eye and the left eye.

Referring to FIG. 2(B), when the extension lines are drawn as described in FIG. 2(A), the image is formed at a crossing point 213 between the extension line R3 of the right image data and the extension line L3 of the left image occurring at a predetermined distance d2 between the right eye and the left eye. Herein, when comparing d1 of FIG. 2(A) with d2 of FIG. 2(B), indicating the distance between the left and right eyes and the positions 203 and 213 where the images are formed, d1 is located further away from the left and right eyes that d2. More specifically, the image of FIG. 2(A) is formed at a position located further away from the left and right eyes than the image of FIG. 2(B).

This results from the distance between the right image data and the left image data (along east-to-west direction referring to FIG. 2). For example, the distance between the right image data 201 and the left image data 202 of FIG. 2(A) is relatively narrower than the distance between the right image data 203 and the left image data 204 of FIG. 2(B). Therefore, based upon FIG. 2(A) and FIG. 2(B), as the distance between the left image data and the right image data becomes narrower, the image formed by the combination of the left image data and the right image data may seem to be formed further away from the eyes of the viewer.

Figure 3:
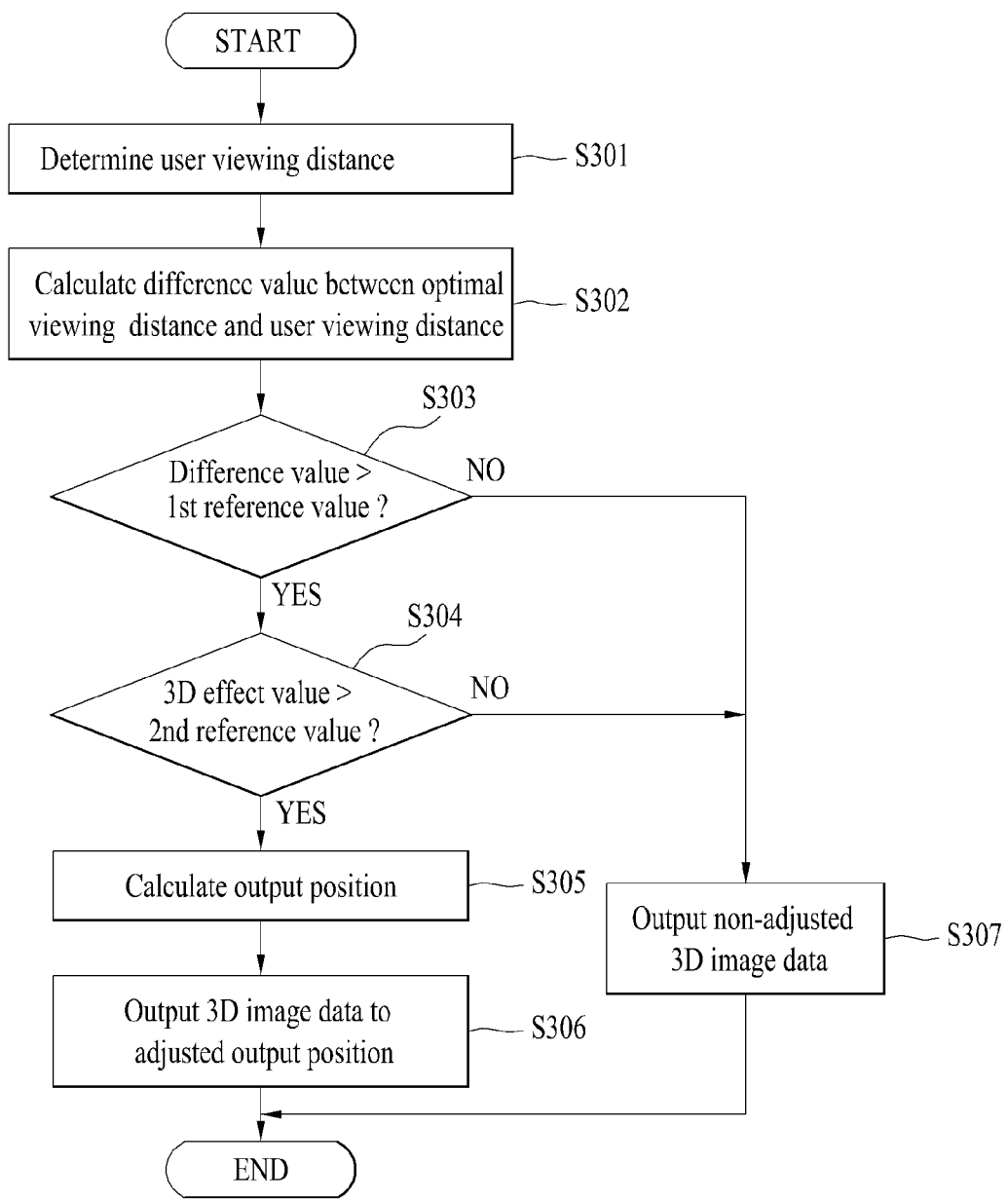
FIG. 3 illustrates a flow chart showing a process of outputting 3D image data from a display device.

FIG. 3 illustrates a flow chart showing a process of outputting 3D image data from a display device. Referring to FIG. 3, the display device according to the embodiment of the present invention determines a user viewing distance between the user (or viewer) and the 3D display device in step S301, when the display device outputs 3D image data. At this point, the display device may receive the user viewing distance from the user through a user interface. Or, by determining a user's position by using a position determining module included in the display device, so as to determine the user viewing distance. For example, the user may select and input a user viewing distance of '1.5' meters (m) from the user interface.

The position of the user may be determined by using various methods. In case the display device according to the present invention uses a 3D display method that does not require the use of glasses (i.e., a naked-eye 3D display method), position information may be generated by having a sensor, which is included in the display device, detect the user's position. And, in case the display device according to the present invention uses a 3D display method that requires the use of glasses (e.g., shutter glasses), position information of the shutter glasses may be generated by detecting the position of the shutter glasses, or by receiving position information from the shutter glasses.

For example, after having a position detecting sensor sense information for detecting the position of the user, the shutter glasses transmit the sensed position detecting information to the display device. Thereafter, the display device receives the detecting information sensed by the shutter glasses and uses the received detecting information to determine the position of the shutter glasses, i.e., the user's position. Moreover, after equipping the display device with an IR sensor, the display device may determine the position of the shutter glasses by detecting an IR signal transmitted from the shutter glasses and calculating the distance between the transmitted IR signal and each of the x, y, and z axises.

Also, according to another embodiment of the present invention, when filming an image after equipping the display device with a camera module, the display device recognizes a pre-stored pattern from the filmed image (an image of the shutter glasses or the front side of the user's face). Thereafter, the display device may determine the position of the user by analyzing the size and angle of the recognized pattern. Furthermore, after equipping the display device with an IR transmission module and equipping the shutter glasses with an IR camera, the display device may determine the position of the shutter glasses by analyzing image data of the IR transmission module, which is filmed by the IR camera. At this point, when the display device is equipped with multiple IR transmission modules, multiple images of the IR transmission modules may be analyzed from the image filmed by the shutter glasses, so as to determine the position of the shutter glasses. Herein, the position of the shutter glasses may be used as the user's position. And, the 3D image data may correspond to 3D image data stored in a storage means included in the display device, or may correspond to 3D image data received from an external device, or may correspond to 3D image data included in a broadcast signal.

In step S302, the display device calculates a difference value between the determined user viewing distance and an optimal viewing distance. Thereafter, the display device determines whether or not the calculated difference value exceeds a first reference value. The optimal viewing distance corresponds to a distance between the display device and the user at which the user may optimally view the 3D image data. Herein, the optimal viewing distance may be differently setup depending upon a display panel size. For example, when the size of the display panel of the display device is equal to '40' inches, the optimal viewing distance may be equal to '2.5' meters.

The first reference value may be predetermined and stored as the first reference value. Then, after reading the display device, the display device compares the difference value between the optimal viewing distance and the user viewing distance to the first reference value. For example, when the user viewing distance is '1.5' meters, and when the optimal viewing distance is '2.5' meters, the display device determines whether or not the difference value '1' meter is more than or equal to the first reference value '0.5' meter.

Based upon the result of step S303, if the difference value between the optimal viewing distance and the user viewing distance exceeds the first reference value, in step S304, the display device determines whether or not a 3D effect value of the 3D image, which is the output subject, exceeds a second reference value. Herein, the 3D effect value may be defined as a 3D object inclusion level in 3D image data or as a depth value of the included 3D object. Herein, the 3D effect may be defined in the 3D image data, or the 3D effect may be calculated by using the 3D image data from a predetermined module.

For example, the display device may calculate a depth value of a 3D object included in the 3D image data and may adjust an output position if the calculated depth value exceeds the second reference value. At this point, the display device extracts edge portions of left image data and right image data included in a predetermined area of the 3D image data and, then, calculates a number of pixels between the left image and the right image, so as to calculate the depth value. Then, if the calculated depth value is greater than the second reference value, the output position of the 3D image data is calculated in step S305.

In step S305, the display device calculates the output position of the 3D image data, which is the output subject. At this point, by shifting the left image data and the right image data of the 3D image data by a predetermined number of pixels, thereby adjusting a horizontal coordinate value, the display device may adjust the depth value of the 3D image data. Herein, the adjusted depth value may be set up so that a viewing angle on the 3D image data from both eyes of the user, who is positioned at the user viewing distance, can be identical to a viewing angle on an object from the two cameras, which are used to create the 3D image data. More specifically, the depth value of the 3D image data is optimally set up from the user's position.

Also, according to the embodiment of the present invention, the depth value, which is adjusted, may be decided based upon a difference value between the user viewing distance and the optimal viewing distance. The process for adjusting the depth value of the 3D image data, which is the output subject, will be described in detail later on with reference to FIG. 6 and FIG. 7.

According to the embodiment of the present invention, the display device may adjust tilt values of the left image data and the right image data of the 3D image data, so as to adjust an outputted tilt value of the 3D image data. At this point, the adjusted tilt value may be received from the user, or the adjusted tilt value may be decided based upon the difference between the user viewing distance and the optimal viewing distance. For example, when the optimal viewing distance is shorter than the user viewing angle by the first reference value or more, the display device adjusts the tilt value to have a smaller value. And, when the optimal viewing distance is longer than the user viewing angle by the first reference value or more, the display device adjusts the tilt value to have a larger value. The process for adjusting the tilt value of the 3D image data, which is the output subject, will be described in detail later on with reference to FIG. 8 and FIG. 9.

In step S306, the display device outputs the 3D image having an adjusted output position in a 3D format. Accordingly, when providing the 3D image data, by outputting the 3D image data after adjusting the output position, based upon the user's environment, the 3D image data may be outputted with an optimal 3D effect. Also, when the 3D effect value of the 3D image data exceeds the reference value, the present invention may output the 3D image data after adjusting the output position. Thus, the processing efficiency may be enhanced, and the 3D image data may be outputted with optimal 3D effect.

Figure 4:
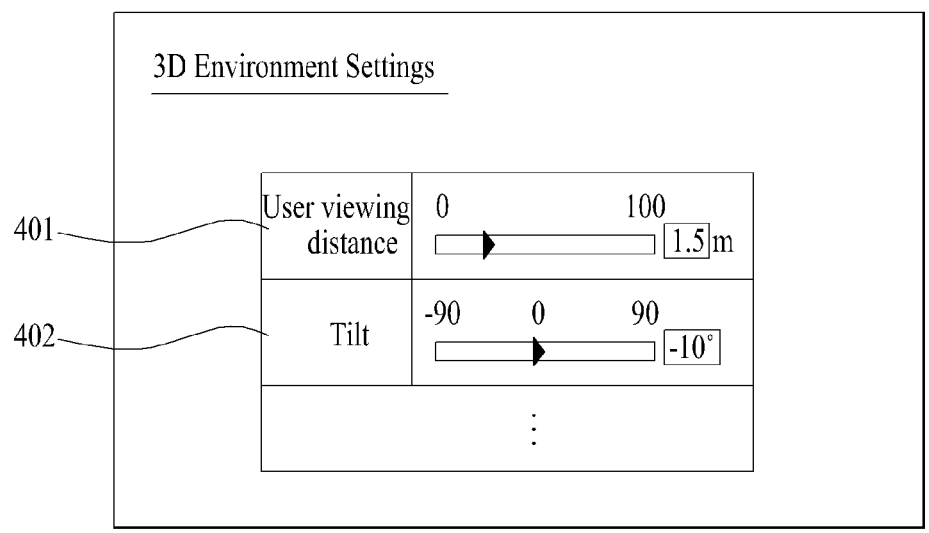
FIG. 4 illustrates a user interface receiving a user viewing distance or tilt value from the user according to an embodiment of the present invention.

FIG. 4 illustrates a user interface receiving a user viewing distance or tilt value from the user according to an embodiment of the present invention. Referring to FIG. 4, the display device according to the embodiment of the present invention may receive a user viewing distance 401 or a tilt value 402, which is to be applied to the 3D image data, from a predetermined user interface 400. When the user viewing distance is inputted, the display device calculates a difference between an optimal viewing distance and the user viewing distance. Then, the display device decides whether or not the output position of the 3D image data is to be adjusted, and the display device may adjust the output position of the 3D image data based upon the calculated difference value. At this point, the output position may be adjusted by adjusting horizontal coordinate values of the left image data and the right image data or by adjusting the tilt value.

When the tilt value 402 is inputted, the display device may output the 3D image data in accordance with the tilt value 402 inputted by the user. And, in case the tilt value is not separately inputted by the user, the tilt value may be decided based upon the difference value between the user viewing distance and the optimal viewing distance.

Figure 5:
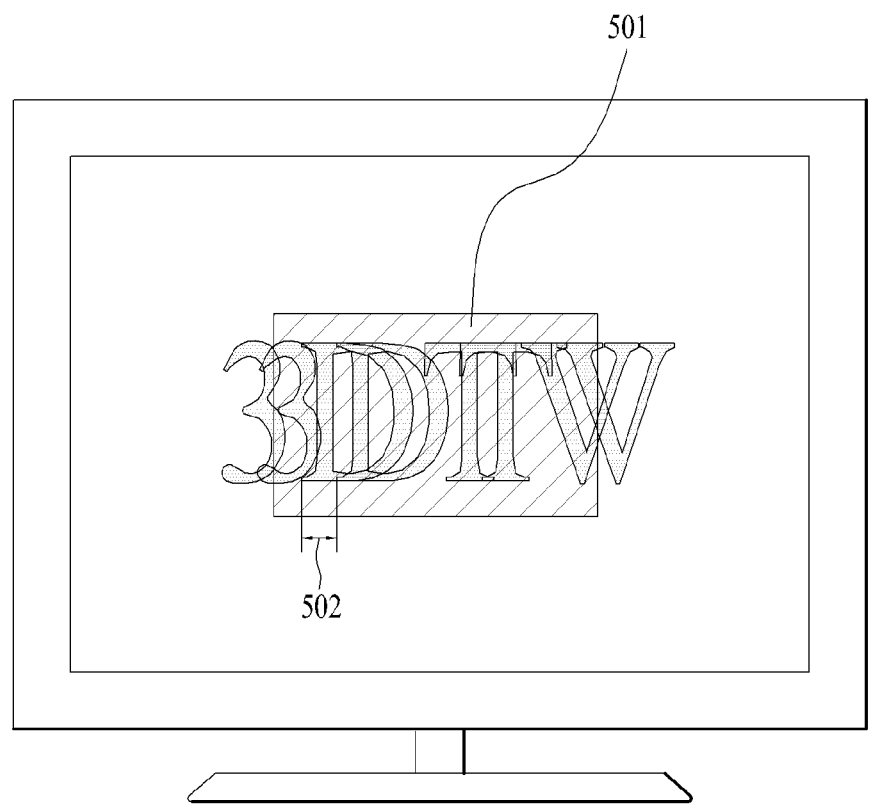
FIG. 5 illustrates an example of calculating a 3D effect value from the 3D image data according to the present invention.

FIG. 5 illustrates an example of calculating a 3D effect value from the 3D image data according to the present invention. Referring to FIG. 5, the display device according to the present invention may determine a 3D effect value of a partial area 501 of the entire 3D image data. The area for which the 3D effect value is to be determined may be diversely set up. For example, a central area of the 3D image data may be set up as the partial area 501. Also, according to the embodiment of the present invention multiple areas may be set up as the partial area 501 for which the 3D effect value is determined.

Herein, a 3D effect value refers to a 3D object inclusion level in the 3D image data, which is the output subject, or may refer to a depth value of the included 3D object. Herein, the 3D effect may be defined in a video signal including the 3D image data, or the 3D effect may be calculated by using the 3D image data from a predetermined module. For example, the display device may calculate a depth value of the 3D object included in the 3D image data. Thereafter, if the calculated depth value exceeds the second reference value, the display device may adjust the output position.

At this point, the display device extracts edge portions of left image data and right image data included in a predetermined area of the 3D image data. Then, the display device may calculate a number of pixels between the left image and the right image, so as to calculate the depth value. For example, the display device may calculate a depth value 'd' of the 3D object by using a number of pixels 502 between the left image data and the right image data. Thereafter, the display device may determine the calculated depth value as the 3D effect value and may, then, compare the calculated 3D effect value (or depth value) with the second reference value.

Figure 6:
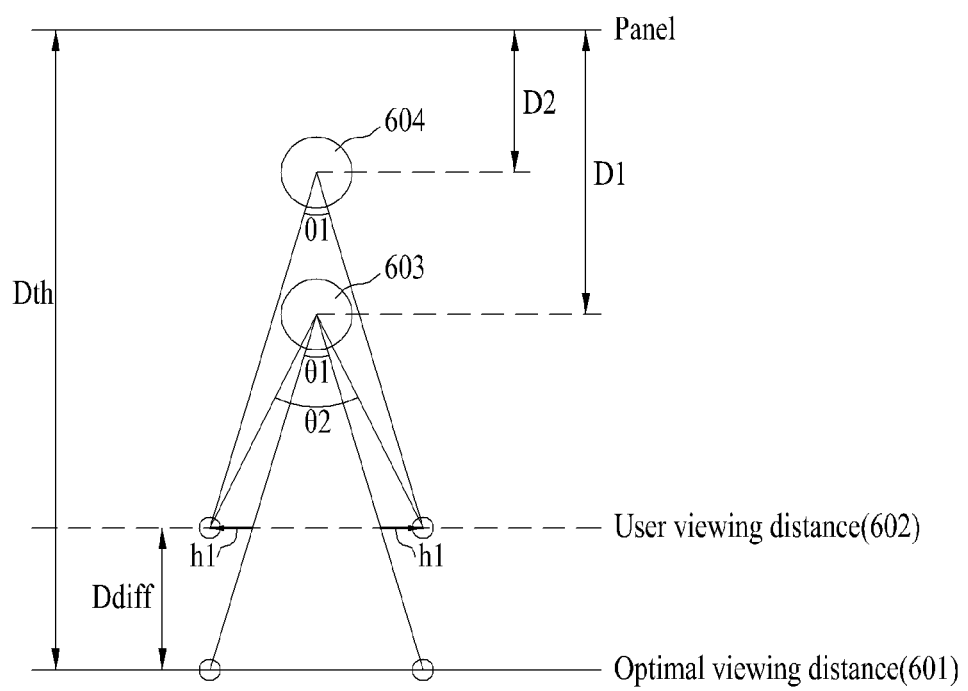
FIG. 6 illustrates an example of adjusting an output position according to an embodiment of the present invention, when a difference value between an optimal viewing distance of the display device and a viewing distance between the user and the display device is equal to or longer than a first standard value.

FIG. 6 illustrates an example of adjusting an output position according to an embodiment of the present invention, when a difference value between an optimal viewing distance of the display device and a viewing distance between the user and the display device is equal to or longer than a first standard value. Referring to FIG. 6, when a difference value Ddiff between the user viewing distance 602, which corresponds to a distance between the panel of the display device according to the embodiment of the present invention and the user, and the optimal viewing distance 601 exceeds the first reference value, the display device may adjust the output position of the 3D image data 603.

At this point, since the 3D image data 603 is outputted based upon the optimal viewing distance, when the user views the 3D image data 603 from the user viewing distance 602, the 3D image data 603 may seem distorted. More specifically, when viewing the 3D image data 603 with both eyes from the optimal viewing distance 601, an angular difference between the two eyes is θ1. And, when viewing the 3D image data 603 with both eyes from the user viewing distance 602, the angular difference between the two eyes is θ2. Accordingly, the display device adjusts the output position 604 of the 3D image data, so that the 3D image data 603 can be optimized when viewed from the user viewing distance 602.

When viewing the 3D image data from the user viewing distance 602, the display device may adjust the output position of the 3D image data so that the angular difference between the two eyes can be equal to θ1. Then, the display device may output the 3D image data to a position corresponding to reference numeral 604. Thereafter, the display device may adjust the depth value of the 3D image data, so that the 3D image data can be shifted from a position corresponding to reference numeral 603 to the position corresponding to reference numeral 604. In other words, the display device adjusts the depth value from D1 to D2.

Herein, the adjusted depth value D2 may be set up so that a viewing angle on the 3D image data 604 from both eyes of the user, who is positioned at the user viewing distance 602, can be identical to a viewing angle on an object from the optimal viewing distance 601 or from the two cameras, which are used to create the 3D image data 603. More specifically, the depth value of the 3D image data is optimally set up from the user's position (i.e., the user viewing distance).

At this point, when the user viewing distance 602 is shorter than the optimal viewing distance 601 by the first reference value or more, the display device may adjust the depth value and the tilt value, so that the depth value and the tilt value of the 3D image data 604 can be decreased. Accordingly, when the user viewing distance is shorter than the optimal viewing distance, the user may view the 3D image outputted with a relatively flatter effect from a longer distance. Thus, the viewer may view the 3D image data with a better sense of stability.

Figure 7:
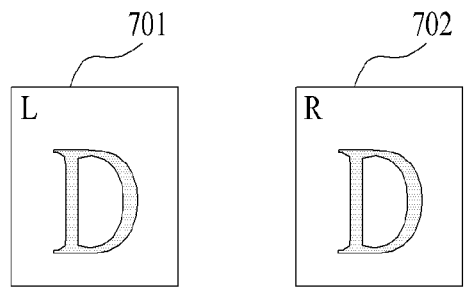
FIG. 7 illustrates an example of adjusting an output position of the 3D image data according to an embodiment of the present invention, when the viewing distance between the user and the display device is shorter than the optimal viewing distance of the display device by the first standard value or more.
Figure 7:
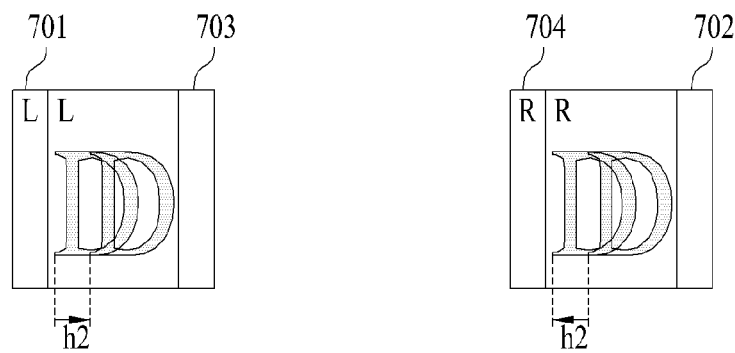
Figure 7:
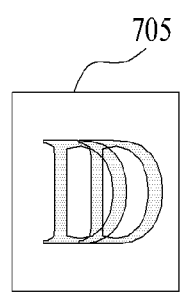

FIG. 7 illustrates an example of adjusting an output position of the 3D image data according to an embodiment of the present invention, when the viewing distance between the user and the display device is shorter than the optimal viewing distance of the display device by the first standard value or more. Referring to FIG. 7, the display device according to the embodiment of the present invention may shift each the left image data 701 and the right image data 702 by a predetermined number of pixels in order to output the 3D image data having the adjusted depth value, which is described with reference to FIG. 6.

At this point, if the user viewing distance is shorter than the optimal viewing distance by the first reference value or more, the display device shifts 703 the horizontal coordinate value of the left image data rightwards by h2, and the display device shifts 704 the horizontal coordinate value of the right image data leftwards by h2. Thereafter, the display device outputs the left image data and the right image data of the 3D image data, each having the output positions adjusted, in a 3D format 705.

Figure 8:
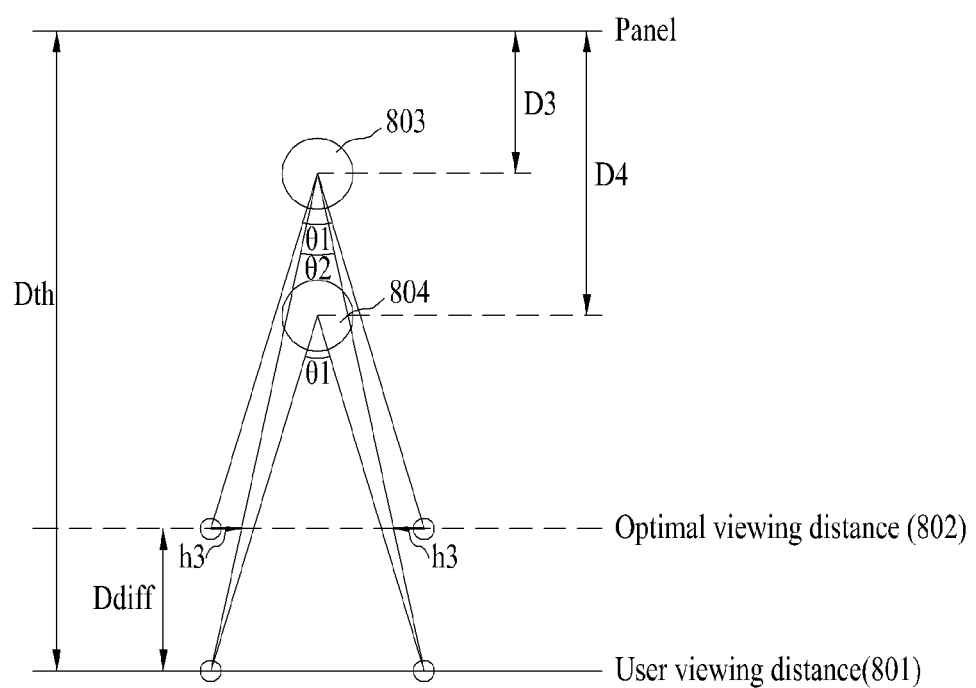
FIG. 8 illustrates another example of adjusting an output position according to an embodiment of the present invention, when a difference value between an optimal viewing distance of the display device and a viewing distance between the user and the display device is equal to or longer than a first standard value.

FIG. 8 illustrates another example of adjusting an output position according to an embodiment of the present invention, when a difference value between an optimal viewing distance of the display device and a viewing distance between the user and the display device is equal to or longer than a first standard value. Referring to FIG. 8, when a difference value Ddiff between the user viewing distance 801, which corresponds to a distance between the panel of the display device according to the embodiment of the present invention and the user, and the optimal viewing distance 802 exceeds the first reference value, the display device may adjust the output position of the 3D image data 803.

At this point, since the 3D image data 803 is outputted based upon the optimal viewing distance, when the user views the 3D image data 803 from the user viewing distance 801 with both eyes, the 3D image data 803 may seem distorted. More specifically, when viewing the 3D image data 803 with both eyes from the optimal viewing distance 802, an angular difference between the two eyes is θ1. And, when viewing the 3D image data 803 with both eyes from the user viewing distance 801, the angular difference between the two eyes is θ2. Accordingly, the display device adjusts the output position 804 of the 3D image data, so that the 3D image data 803 can be optimized when viewed from the user viewing distance 801.

When viewing the 3D image data from the user viewing distance 801, the display device may adjust the output position of the 3D image data so that the angular difference between the two eyes can be equal to θ1. Then, the display device may output the 3D image data to a position corresponding to reference numeral 804. Thereafter, the display device may adjust the depth value of the 3D image data, so that the 3D image data can be shifted from a position corresponding to reference numeral 803 to the position corresponding to reference numeral 804. In other words, the display device adjusts the depth value of the 3D image data from D3 to D4.

Herein, the adjusted depth value D4 may be set up so that a viewing angle on the 3D image data 804 from both eyes of the user, who is positioned at the user viewing distance 801, can be identical to a viewing angle on an object from the optimal viewing distance 802 or from the two cameras, which are used to create the 3D image data 803. More specifically, the depth value of the 3D image data 804 is optimally set up from the user's position.

At this point, when the user viewing distance 801 is longer than the optimal viewing distance 802 by the first reference value or more, the display device may adjust the depth value and the tilt value, so that the depth value and the tilt value of the 3D image data 804 can be increased. Accordingly, when the user viewing distance is longer than the optimal viewing distance, the user may view the 3D image outputted with a relatively steeper tilted effect from a short distance. Thus, the viewer may view the 3D image data with a better sense of stability.

Figure 9:
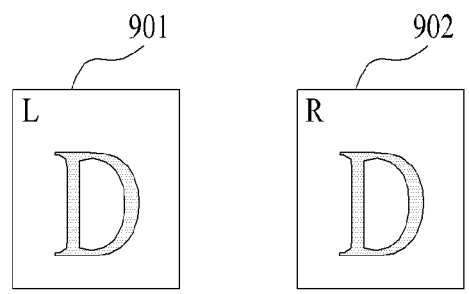
FIG. 9 illustrates an example of adjusting the output position of the 3D image data according to the embodiment of the present invention, when the viewing distance between the user and the display device is longer than the optimal viewing distance of the display device by the first standard value or more.
Figure 9:
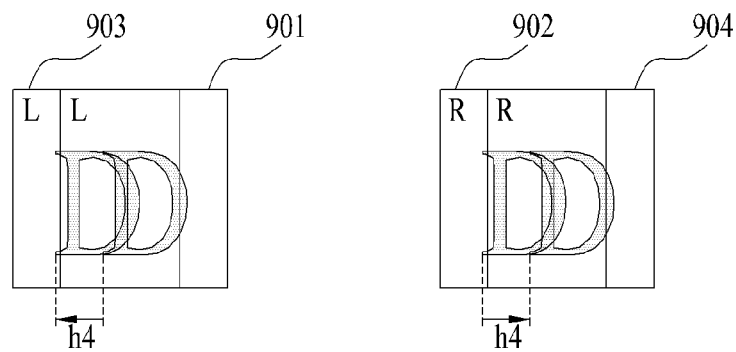
Figure 9:
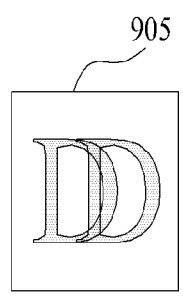

FIG. 9 illustrates an example of adjusting the output position of the 3D image data according to the embodiment of the present invention, when the viewing distance between the user and the display device is longer than the optimal viewing distance of the display device by the first standard value or more. Referring to FIG. 9, the display device according to the embodiment of the present invention may shift each the left image data 901 and the right image data 902 by a predetermined number of pixels in order to output the 3D image data having the adjusted depth value, which is described with reference to FIG. 8.

At this point, if the user viewing distance is longer than the optimal viewing distance by the first reference value or more, the display device shifts 903 the horizontal coordinate value of the left image data leftwards by h4, and the display device shifts 904 the horizontal coordinate value of the right image data rightwards by h4. Thereafter, the display device outputs the left image data and the right image data of the 3D image data, each having the output positions adjusted, in a 3D format 905.

Figure 10:
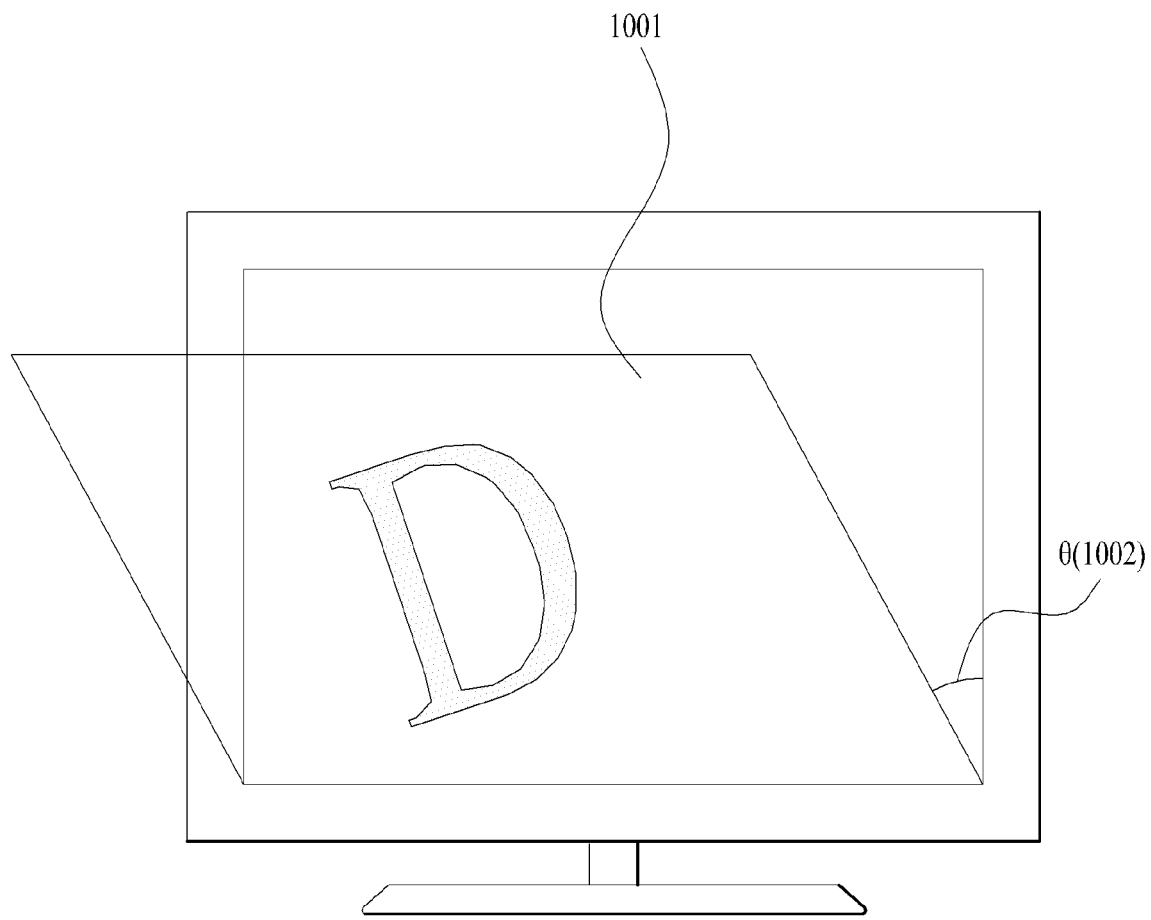
FIG. 10 illustrates an example of adjusting a tilt value of the 3D image data according to the embodiment of the present invention, when the viewing distance between the user and the display device is longer than the optimal viewing distance of the display device by the first standard value or more.

FIG. 10 illustrates an example of adjusting a tilt value of the 3D image data according to the embodiment of the present invention, when the viewing distance between the user and the display device is longer than the optimal viewing distance of the display device by the first standard value or more. Referring to FIG. 10, when the user viewing distance is longer than the optimal viewing distance by the first reference value or more, the display device according to the embodiment of the present invention may correct the 3D image data 1001 so that the tilt value 1002 of the 3D image data 1001 can be increased.

At this point, the display device may adjust the tilt value of the 3D image data 1001, by processing 3D output, after adjusting the tilt value of the left image data and adjusting the tilt value of the right image. The increasing tilt value may vary in accordance with a difference value between the user viewing distance and the optimal viewing distance. For example, the increasing tilt value may be set to be increased in proportion with the user viewing distance and the optimal viewing distance.

Figure 11:
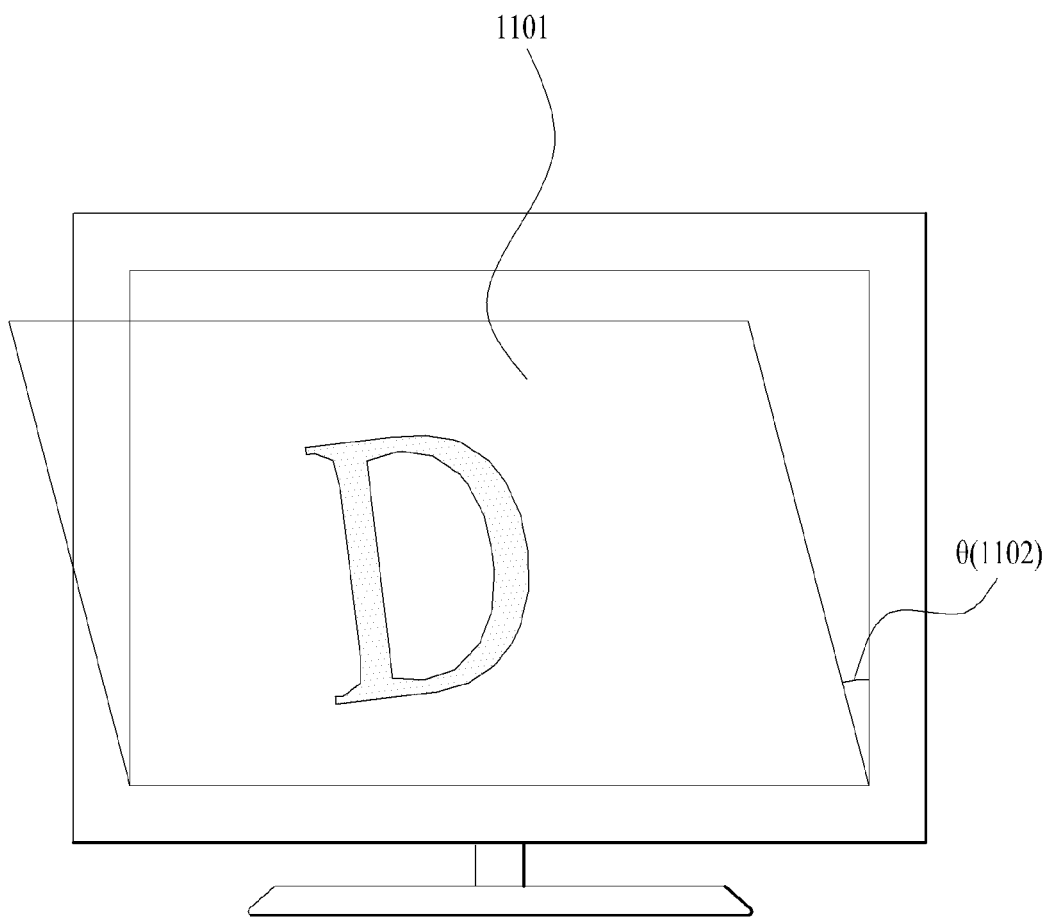
FIG. 11 illustrates an example of adjusting a tilt value of the 3D image data according to the embodiment of the present invention, when the viewing distance between the user and the display device is shorter than the optimal viewing distance of the display device by the first standard value or more.

FIG. 11 illustrates an example of adjusting a tilt value of the 3D image data according to the embodiment of the present invention, when the viewing distance between the user and the display device is shorter than the optimal viewing distance of the display device by the first standard value or more. Referring to FIG. 11, when the user viewing distance is shorter than the optimal viewing distance by the first reference value or more, the display device according to the embodiment of the present invention may correct the 3D image data 1101 so that the tilt value 1102 of the 3D image data 1101 can be increased.

At this point, the display device may adjust the tilt value of the 3D image data 1101, by processing 3D output, after adjusting the tilt value of the left image data and adjusting the tilt value of the right image. According to the embodiment of the present invention, the decreasing tilt value may vary in accordance with a difference value between the user viewing distance and the optimal viewing distance. For example, the decreasing tilt value may be set to be decreased in proportion with the user viewing distance and the optimal viewing distance.

Figure 12:
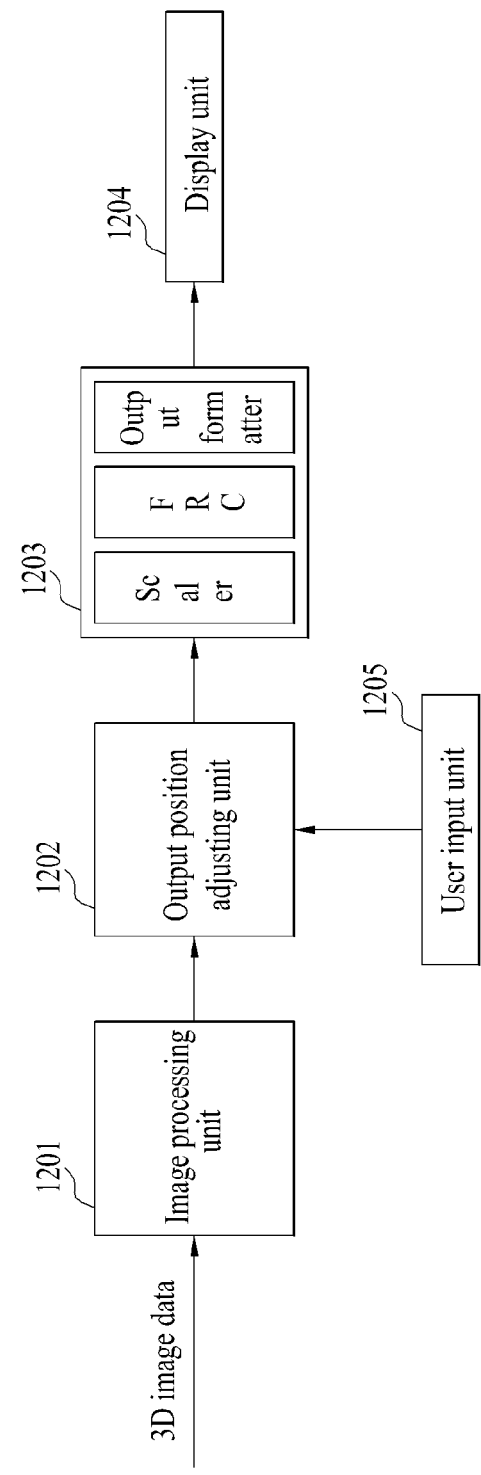
FIG. 12 illustrates a block view showing the structure of a display device according to an embodiment of the present invention.

FIG. 12 illustrates a block view showing the structure of a display device according to an embodiment of the present invention. Referring to FIG. 12, the display device includes an image processing unit 1201, an output position adjusting unit 1202, a 3D formatter 1203, a display unit 1204, and a user input unit 1205. Herein, the image processing unit 1201 is configured to video process 3D image data in accordance with a panel size of the display unit 1204 and user settings. The output position adjusting unit 1202 is configured to adjust output positions of 3D image data in accordance with a user viewing distance. The 3D formatter 1203 is configured to output 3D image data in a respective format. The display unit 1204 is configured to output the 3D image data processed to a 3D format. And, the user input unit 1205 is configured to receive the user's input. The display device may further include a position determining module (not shown).

The output position adjusting unit 1202 determines a user viewing distance between the user and the display device, calculates a difference value between the determined user viewing distance and an optimal viewing distance, and then adjusts an output position of a 3D image, which is the output subject, when the difference value exceeds a first reference value. At this point, the output position adjusting unit 1202 calculates a 3D effect value of the 3D image data. And, when the 3D effect value exceeds a second reference value, the output position adjusting unit 1202 may adjust the output position of the 3D image data.

Also, the output position adjusting unit 1202 calculates a depth value of the 3D image data, which is included in a predetermined area of the 3D image data. Then, when the calculated depth value exceeds the second reference value, the output position adjusting unit 1202 may adjust the output position of the 3D image data.

Moreover, according to the embodiment of the present invention, the output position adjusting unit 1202 may adjust a depth value of the 3D image data depending upon the calculated difference value. For example, when the user viewing distance is longer than the optimal viewing distance by the first reference value or more, the output position adjusting unit 1202 may increase the depth value of the 3D image data, which corresponds to the output subject. And, when the user viewing distance is shorter than the optimal viewing distance by the first reference value or more, the output position adjusting unit 1202 may decrease the depth value of the 3D image data, which corresponds to the output subject.

Furthermore, the output position adjusting unit 1202 may adjust a tilt value of the 3D image data depending upon the calculated difference value. For example, when the user viewing distance is shorter than the optimal viewing distance by the first reference value or more, the output position adjusting unit 1202 may decrease the tilt value of the 3D image data, which corresponds to the output subject. And, when the user viewing distance is longer than the optimal viewing distance by the first reference value or more, the output position adjusting unit 1202 may increase the tilt value of the 3D image data, which corresponds to the output subject.

The user input unit 1205 receives a key input from the user through a remote controlling device, such as a remote controller. And, most particularly, the user input unit 1205 may receive the user viewing distance from a user interface. The 3D formatter 1203 outputs the 3D image having its output position adjusted in a 3D format. At this point, a scaler performs scaling on left image data and right image data of the 3D image data, so that the left and right image data can be scaled to a size adequate for output. A frame rate controller (FRC) adjusts (or controls) a frame rate of the 3D image data to an output frame rate of the display device. An output formatter outputs the left image data and the right image data, each having the output position adjusted, in a 3D format. The output formatter outputs the 3D image data to the display unit 1204.

At this point, when the display device corresponds to a shutter glasses type display device, the output formatter generates a synchronization signal Vsync respective to the configured 3D image data so that synchronization can be realized when viewing the 3D image data through the shutter glasses. Then, the output formatter outputs the generated Vsync signal to an IR emitter (not shown), which is included in the shutter glasses, so as to allow the user to view the 3D image data through the shutter glasses, which provides a synchronized display. The IR emitter receives the synchronization signal generated by the output formatter and outputs the generated synchronization signal to a light receiving unit (not shown) within the shutter glasses. Then, the shutter glasses adjusts a shutter opening cycle period in accordance with the synchronization signal, which is received by the IR emitter (not shown) after passing through the light receiving unit (not shown). Thus, synchronization of the 3D image data being outputted from the display unit 1204 may be realized. Herein, a position sensing module (not shown) may sense the position of the user at predetermined time intervals. The display unit 1204 outputs contents, UIs, and so on.

Figure 13:
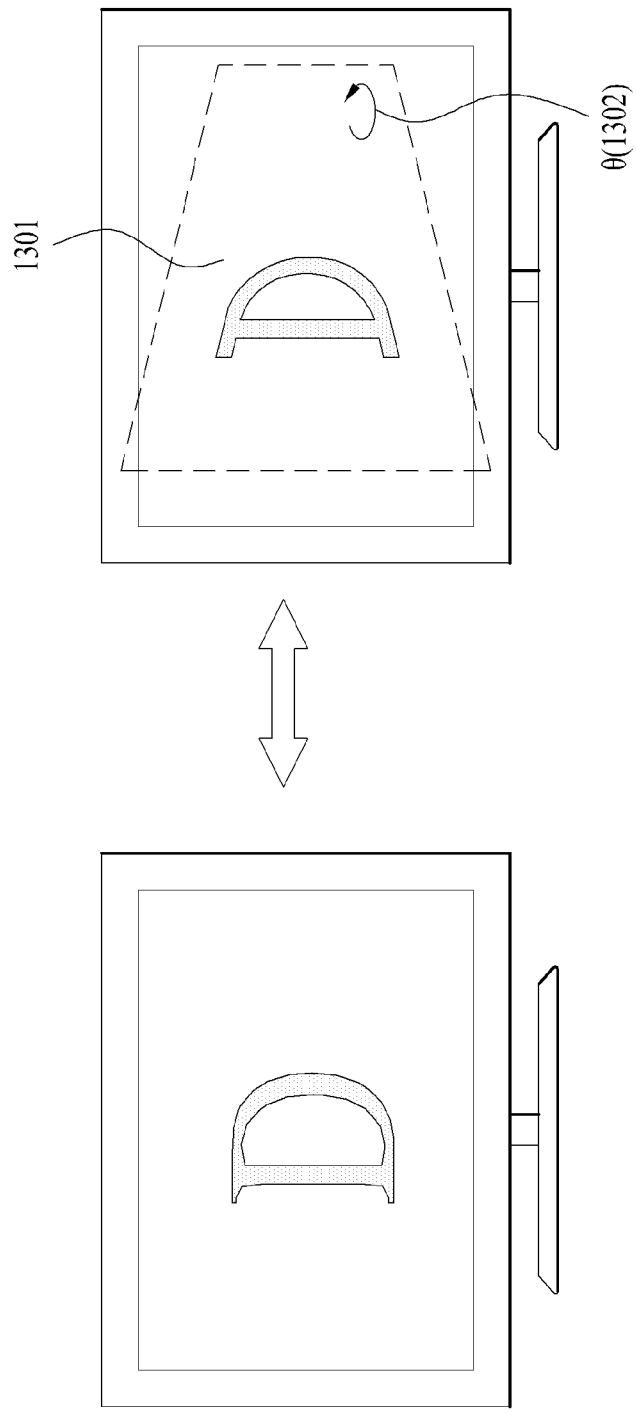
FIG. 13 illustrates an example of adjusting (or controlling) a horizontal tilt value of 3D image data according to an embodiment of the present invention.

FIG. 13 illustrates an example of adjusting (or controlling) a horizontal tilt value of 3D image data according to an embodiment of the present invention. Referring to FIG. 13, the display device according to the embodiment of the present invention may correct the 3D image data 1301, based upon the user environment (e.g., when the user viewing distance is longer than the optimal viewing distance by the first reference value or more), so that the horizontal tilt value 1302 can be changed. At this point, the display device according to the embodiment of the present invention may adjust the tilt value respective to at least one of the left-eye image and the right-eye image. Then, by processing the 3D output, the display device may adjust the overall tilt value.

Figure 14:
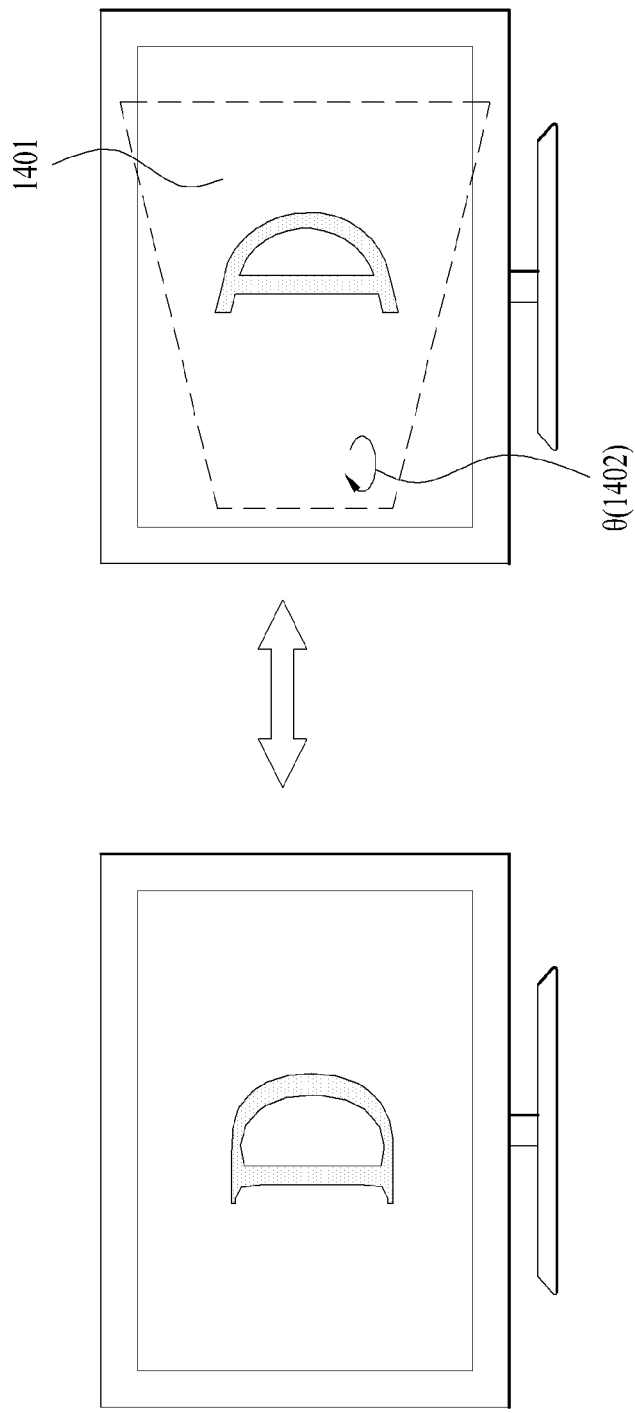
FIG. 14 illustrates another example of adjusting (or controlling) a horizontal tilt value of 3D image data according to an embodiment of the present invention.

FIG. 14 illustrates another example of adjusting (or controlling) a horizontal tilt value of 3D image data according to an embodiment of the present invention. Unlike the example shown in FIG. 13, it is assumed in the example shown in FIG. 14 that the user is positioned at the other (or opposite) side. Referring to FIG. 14, the display device according to the embodiment of the present invention may correct the 3D image data 1401, based upon the user environment (e.g., when the user viewing distance is longer than the optimal viewing distance by the first reference value or more), so that the horizontal tilt value 1402 can be changed. At this point, the display device according to the embodiment of the present invention may adjust the tilt value respective to at least one of the left-eye image and the right-eye image. Then, by processing the 3D output, the display device may adjust the overall tilt value.

The increasing tilt value may vary depending upon the difference value between the user viewing distance and the optimal viewing distance. For example, the tilt value may be determined so as to be proportional to the difference value between the user viewing distance and the optimal viewing distance. Alternatively, the tilt value may be designed to be arbitrarily selected and decided by the user.

Additionally, according to another embodiment of the present invention, a method of outputting an image from the 3D display device may include the steps of adjusting output positions of one of a first video image and a second video image, adjusting an angle of one of the first video image and the second video image, and outputting the first video image and the second video image in a 3D format. Furthermore, according to yet another embodiment of the present invention, the method of outputting an image from the 3D display device may further include receiving information on an output position and information on an output angle through a user interface (ref. FIG. 4). When the present invention is designed as described above, an optimal 3D image may be viewed regardless of the user's (or viewer's) position.

As described above, the method for processing images in a display device outputting 3-dimensional (3D) contents and the display device using the same have the following advantages. According to the present invention, when providing 3D image data, by outputting 3D image data after adjusting the output position in accordance with the user's viewing conditions, the 3D image data may be outputted with optimal depth perception. Also, when a 3D effect value of the 3D image data exceeds the reference value, by outputting the 3D image data after adjusting the output position, processing efficiency may be enhanced, and the 3D image data may be outputted with optimal depth perception.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of outputting images from a 3-dimensional (3D) display device, the method comprising:
setting an optimal viewing distance which is related to a size of a display panel of the 3D display device;
determining a user viewing distance, the user viewing distance corresponding to a distance between a user and the 3D display device; and
displaying 3D image data based on the set optimal viewing distance and the user viewing distance,
wherein the displayed 3D image data has a first depth value and a first tilt value for the displayed 3D image when the user viewing distance is shorter than the optimal viewing distance by at least a first reference value,
wherein the displayed 3D image data has a second depth value which is greater than the first depth value and a second tilt value which is greater than the first tilt value when the user viewing distance is longer than the optimal viewing distance by at least the first reference value,
wherein each of the first tilt value and the second tilt value comprises a horizontal tilt value and a vertical tilt value, and
wherein the determining the user viewing distance further includes detecting an IR signal received from predetermined glasses and determining a position of the predetermined glasses on x, y, and z axes based on the detected IR signal.

2. The method of claim 1, further comprising:
receiving information on an output position and information on an output angle through a user interface.

3. The method of claim 1, further comprising:
calculating a difference value between the determined user viewing distance the set optimal viewing distance, and, when the calculated difference value is greater than or equal to the first reference value, adjusting an output position of the 3D image data, the 3D image data being an output subject,
wherein the 3D image data is displayed at the adjusted output position.

4. The method of claim 3, further comprising:
calculating a 3D effect value of the 3D image data and, when the calculated 3D effect value is greater than or equal to a second reference value, adjusting an output position of the 3D image data.

5. The method of claim 3, further comprising:
adjusting a depth value of the 3D image data in accordance with the calculated difference value.

6. The method of claim 5, further comprising:
when the user viewing distance is longer than the optimal viewing distance by at least the first reference value, increasing a depth value of the 3D image data, the 3D image data being the output subject.

7. The method of claim 5, further comprising:
when the user viewing distance is shorter than the optimal viewing distance by at least the first reference value, decreasing a depth value of the 3D image data, the 3D image data being the output subject.

8. The method of claim 3, further comprising:
adjusting a tilt value of the 3D image data in accordance with the calculated difference value.

9. The method of claim 8, further comprising:
when the user viewing distance is shorter than the optimal viewing distance by at least the first reference value, decreasing a tilt value of the 3D image data, the 3D image data being the output subject.

10. The method of claim 8, further comprising:
when the user viewing distance is longer than the optimal viewing distance by at least the first reference value, increasing a tilt value of the 3D image data, the 3D image data being the output subject.

11. A 3-dimensional (3D) display device, comprising:
a position determining part to determine a user viewing distance, the user viewing distance corresponding to a distance between a user and the 3D display device;
an output position adjuster to determine an output position of 3D image data based on an optimal viewing distance and the user viewing distance, the optimal viewing distance being predetermined depending on a size of a display panel of the 3D display device; and
a display configured to display the 3D image data at the determined output position,
wherein the displayed 3D image data has a first depth value and a first tilt value for the displayed 3D image when the user viewing distance is shorter than the optimal viewing distance by at least a first reference value,
wherein the displayed 3D image data has a second depth value which is larger than the first depth value and a second tilt value which is larger than the second tilt value when the user viewing distance is longer than the optimal viewing distance by at least the first reference value,
wherein each of the first tilt value and the second tilt value comprises a horizontal tilt value and a vertical tilt value, and
wherein, when the user viewing distance is determined, the position determining part detects an IR signal received from predetermined glasses and determines a position of the predetermined glasses on x, y, and z axes based on the detected IR signal.

12. The 3D display device of claim 11, wherein the output position adjuster calculates a difference value between the determined user viewing distance and the set optimal viewing distance and, when the calculated difference value is greater than or equal to the first reference value, the output position adjuster adjusts the output position of the 3D image data.

13. The 3D display device of claim 11, wherein the output position adjuster calculates a 3D effect value of the 3D image data and, when the calculated 3D effect value is greater than or equal to a second reference value, the output position adjuster adjusts an output position of the 3D image data.

14. The 3D display device of claim 13, wherein the output position adjuster calculates a depth value of the 3D image data corresponding to a predetermined area of the 3D image data and, when the depth value is greater than or equal to the second reference value, the output position adjuster adjusts the output position of the 3D image data.

15. The 3D display device of claim 12, wherein the output position adjuster adjusts a depth value of the 3D image data in accordance with the difference value.

16. The 3D display device of claim 15, wherein, when the user viewing distance is longer than the optimal viewing distance by at least the first reference value, the output position adjuster increases a depth value of the 3D image data.

17. The 3D display device of claim 15, wherein, when the user viewing distance is shorter than the optimal viewing distance by at least the first reference value, the output position adjuster decreases a depth value of the 3D image data.

18. The 3D display device of claim 12, wherein the output position adjuster adjusts a tilt value of the 3D image data in accordance with the difference value.

19. The 3D display device of claim 18, wherein, when the user viewing distance is shorter than the optimal viewing distance by at least the first reference value, the output position adjuster decreases a tilt value of the 3D image data.

20. The 3D display device of claim 18, wherein, when the user viewing distance is longer than the optimal viewing distance by at least the first reference value, the output position adjuster increases a tilt value of the 3D image data.

* * * * *